United States Patent [19]

Endo et al.

[11] Patent Number: 4,589,069
[45] Date of Patent: May 13, 1986

[54] DATA INPUT/OUTPUT SYSTEM FOR GASOLINE STATIONS

[75] Inventors: Keizo Endo; Hiroshi Matsumura; Norio Shimamura; Masaru Kawabe, all of Tokyo, Japan

[73] Assignee: Tokyo Tatsuno Co., Ltd., Tokyo, Japan

[21] Appl. No.: 531,542

[22] Filed: Sep. 12, 1983

[30] Foreign Application Priority Data

Sep. 18, 1982 [JP] Japan ................. 57-162937
Sep. 18, 1982 [JP] Japan ................. 57-162939
Sep. 20, 1982 [JP] Japan ................. 57-162289

[51] Int. Cl.⁴ .................. G06F 15/24; G06F 7/12; B67D 5/30
[52] U.S. Cl. ................... 364/405; 235/381; 340/825.36; 364/406; 364/465
[58] Field of Search ............. 364/405, 465, 406, 510; 340/825.35, 825.58, 825.36; 235/375, 378, 380, 381, 432

[56] References Cited

U.S. PATENT DOCUMENTS

| | | | |
|---|---|---|---|
| 3,878,377 | 4/1975 | Brunone | 364/465 |
| 3,897,887 | 8/1975 | Goldberg | 340/825.58 |
| 3,913,069 | 10/1975 | Rundin et al. | 340/825.35 |
| 3,949,207 | 4/1976 | Savary et al. | 364/510 |
| 4,034,193 | 7/1977 | Jackson | 364/465 |
| 4,075,460 | 2/1978 | Gorgens | 364/465 X |
| 4,087,858 | 5/1978 | Pichler et al. | 364/465 |
| 4,186,381 | 1/1980 | Fleischer et al. | 364/465 X |
| 4,216,529 | 8/1980 | Krystek et al. | 364/465 |
| 4,220,991 | 9/1980 | Hamano et al. | 364/405 |
| 4,247,899 | 1/1981 | Schiller et al. | 364/465 |
| 4,395,627 | 7/1983 | Barker et al. | 235/381 |
| 4,493,038 | 1/1985 | Bovio et al. | 364/405 |

*Primary Examiner*—Felix D. Gruber
*Attorney, Agent, or Firm*—Jordan and Hamburg

[57] ABSTRACT

A data input/output system for gasoline stations which has a console arranged in an office cabin and electrically connected to each of a plurality of outdoor fuel dispensers, said console comprising a fuel dispensation control panel which has a fuel dispensation permission key to be operated for actuating the dispenser, in response to an order from a customer or an operator, a key board for inputing sales data on a dispensed fuel and other merchandise, a display for indicating operation instructions and input data, a printer for printing the data on a slip, a cash box, and a control unit connected to each of said elements to control the same. The system may have a card reader and a recording unit to allow and conduct credit sales.

8 Claims, 19 Drawing Figures

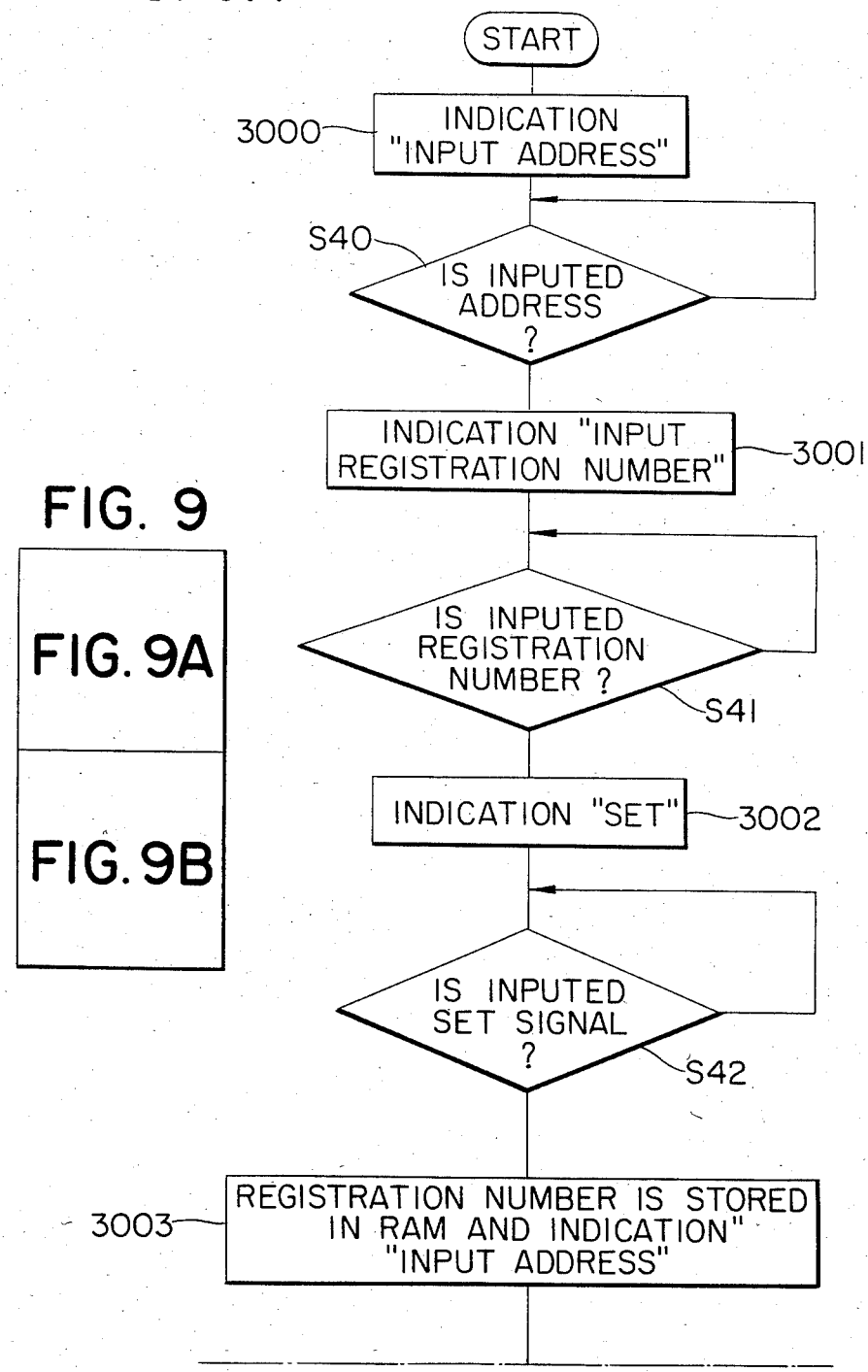

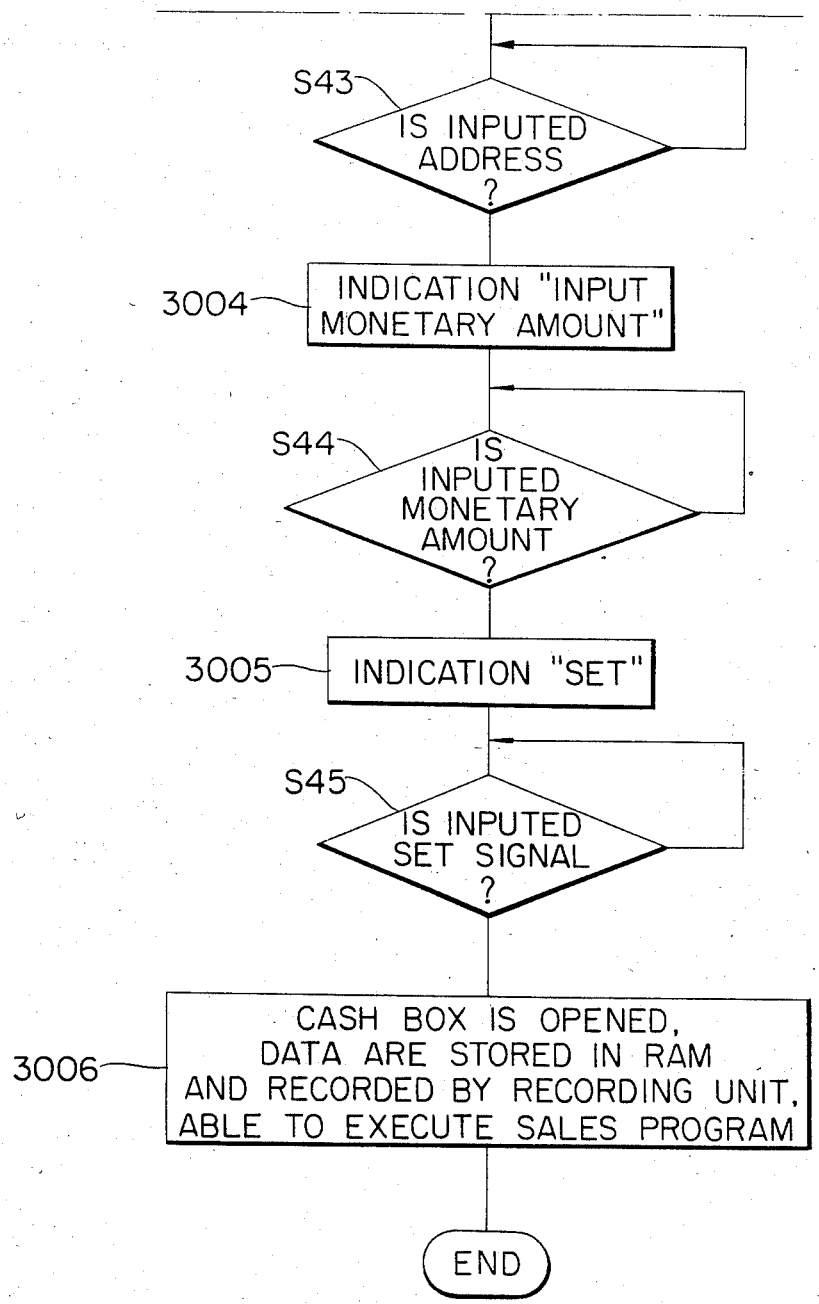

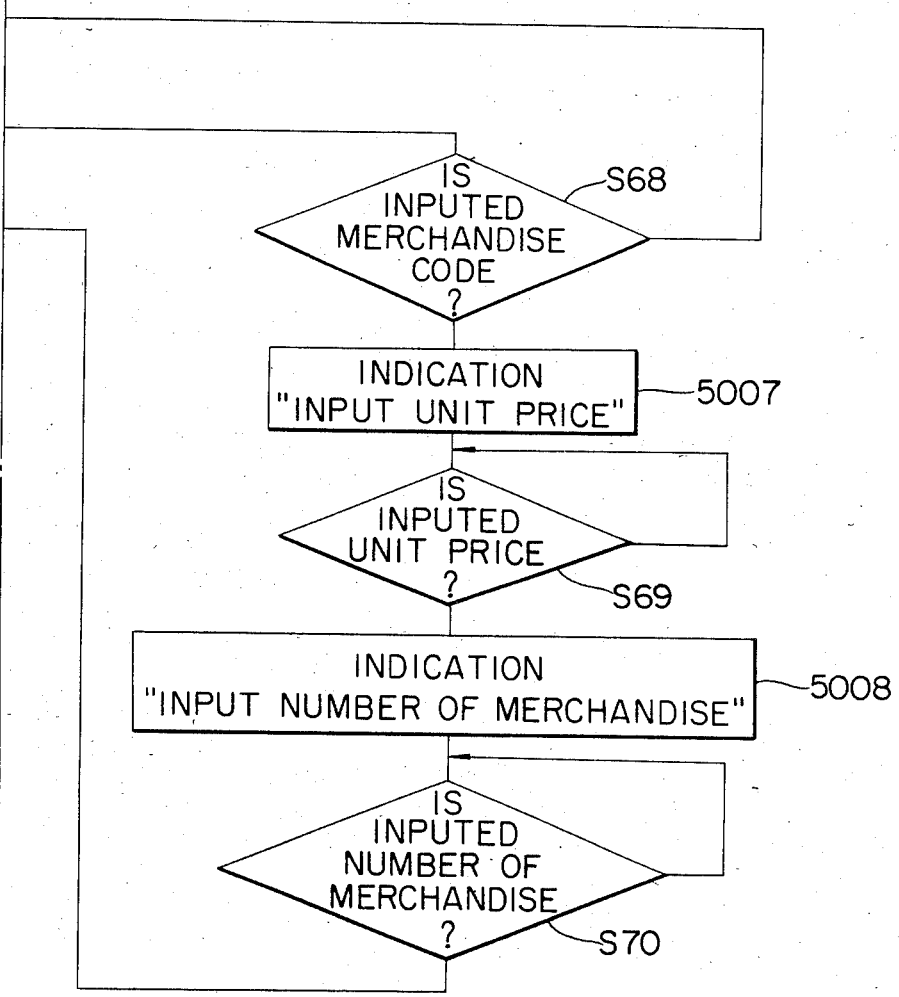

DATA INPUT/OUTPUT SYSTEM FOR GASOLINE STATIONS

BACKGROUND OF THE INVENTION

The present invention relates to a data input/output system for systematically conducting management of gasoline stations.

Nowadays most gasoline stations function as a station giving various services by not only supplying or selling lead-free gasoline, lead containing gasoline, light oil, kerosene or the like fuel, but also selling tires, lubricating oil, batteries, polishing wax, car accessories as well as giving other services such as battery charging, car washing, checking and completing various car mechanisms and the like. Even if limited to the fuel supplying service, there are two types, namely a normal service system, wherein an operator actuates a dispenser in response to an order by a customer and a so-called self service system, wherein a customer operates himself the dispenser and an officer in a cabin watches and checks the customer's fuel supplying operation.

Hitherto, a sales data input/output device incorporating a micro-processor or an electronic cash register has widely been utilized in various fields. It has also been in public knowledge to arrange in a gasoline station cabin a console comprising a micro-processor electrically connected to a plurality of fuel dispensers (U.S. Pat. No. 3,897,887 issued Aug. 5, 1975 to M. Goldberg and U.S. Pat. No. 3,913,069 issued Oct. 14, 1975 to S. E. Rundin et al).

On the other hand, the cash register has been used in gasoline stations for handling money regarding sold fuel, tires, batteries, accessory or the like goods.

SUMMARY OF THE INVENTION

A main object of the present invention is to provide a data input/output system for gasoline stations, which may function as both the operator console and the cash register.

According to the invention, the object is attained by providing a data input/output system for gasoline stations, which comprises a fuel dispensation control panel having a fuel dispensation request lamp to be flickered by a fuel dispensation request signal from a concerned fuel dispenser, a fuel dispensation permission switch for making operable said concerned dispenser, and a fuel dispensation completion lamp to be lit-up by a fuel dispensation completion signal from the dispenser; a key board for inputing sales data on a dispensed fuel and other merchandise; a diplay for indicating the inputed data; a printing unit for printing out the data on a slip; a cash box for accommodating cash, checks and the like; and a control unit connected to each of said elements to control the same.

The system may further comprise a card reader which is able to read out a magnetic code on a personal card and a personal identification number pad key which may be required in addition to the card reader, to allow cashless sales.

Said control unit comprises a central processing unit (CPU), a read-only memory (ROM), a random access memory (RAM), an input control section, an output control section and a common bus for connecting the elements with one another. Various programs for operating the system are stored in the ROM. In the RAM, there are set at least a temporary memory area, an area for storing total cash sales, an area for storing a monetary amount to be kept in the cash box, and an area for storing a predetermined monetary amount to be set to issue an alarm when the cash in the cash box exceeds the set amount. The key board is connected to the input control section of said control unit and comprises a ten-keys switch, a merchandise-code switch, an issue key and a mode-change switch. An officer may select one of pre-payment, post-payment and attendant modes. The printing unit comprises a first printer of a normal dot-type and a second printer such as a signature-slip printer which is able to record and print out a customer's signature or seal and is arranged in lieu of a conventional in-printer.

The system may further comprise a magnetic tape or floppy disc recorder to receive and record output transaction data which may directly be transmitted through a modem to a remote center for data analysis, or said tape or floppy disc per se may be sent to an analysis station.

The system may be connected to an outdoor terminal to allow both a fuel dispensation and slip-issuance operations, on a station island, which comprises a card reader interconnected to the card reader in the system, ten-keys for selecting a dispenser to be used, dispenser indication lamps showing occupied and unoccupied dispensers, a display which serves for confirming input data and for guiding operations on fuel dispensation, and a printer for printing a receipt.

BRIEF DESCRIPTION OF THE DRAWINGS

The invention will be more fully understood from the following description together with the accompanying drawings in which

FIGS. 9A and 9B are to be combined as in FIG. 9 to show a flow diagram of a sequence on execution of an initializing program;

FIGS. 11A, 11B and 11C are to be combined as in FIG. 11 to show a flow diagram of a sequence on execution of a second business program (various sales treatments);

DETAILED DESCRIPTION OF PREFERRED EMBODIMENT

Figure 1:
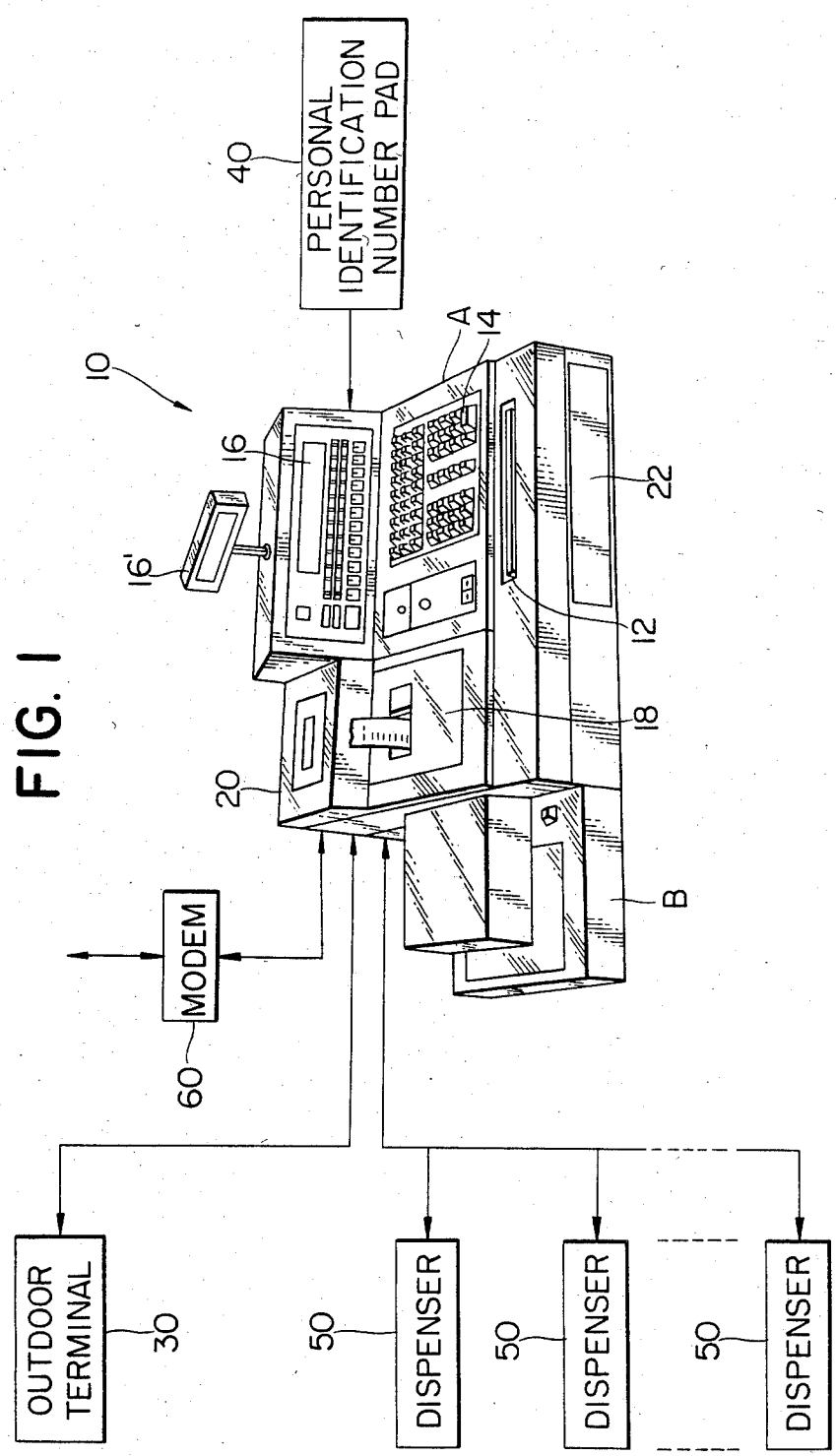
FIG. 1 is a view showing a preferred design of a data input/output system for gasoline stations, according to the present invention.

Referring to FIG. 1, there is shown a data input/output system according to the present invention. The system 10 is formed as a box-like console to be arranged in an office cabin for gasoline stations and having a main body A which comprises a card reader unit 12 for reading out a magnetic code on a card, a key board 14, a fuel dispensation control panel 16, a printing unit 18 and a recording unit 20, for instance as a magnetic tape or floppy disc recorder. The fuel dispensation control panel 16 has control and display sections as explained later with reference to FIG. 3 as well as an auxiliary display 16'. To the main body A of the system, there may be additionally connected a second printing unit B which is a so-called signature-slip printer and able to issue a slip allowing a signature or seal of a customer thereon, who wishes to clear a charge by his non-magnetic type card, for instance a so-called "embossed card".

The system 10 is interconnected to an outdoor terminal 30, a personal identification number pad 40 and a plurality of fuel dispensers 50, respectively, the members 30 and 40 being explained later with reference to FIGS. 4 and 5. A magnetic tape or floppy disc recorded by the recording unit 20 may be sent to a station for data analysis thereof or the recorded data may directly be sent to the station through a modem 60.

Figure 2:
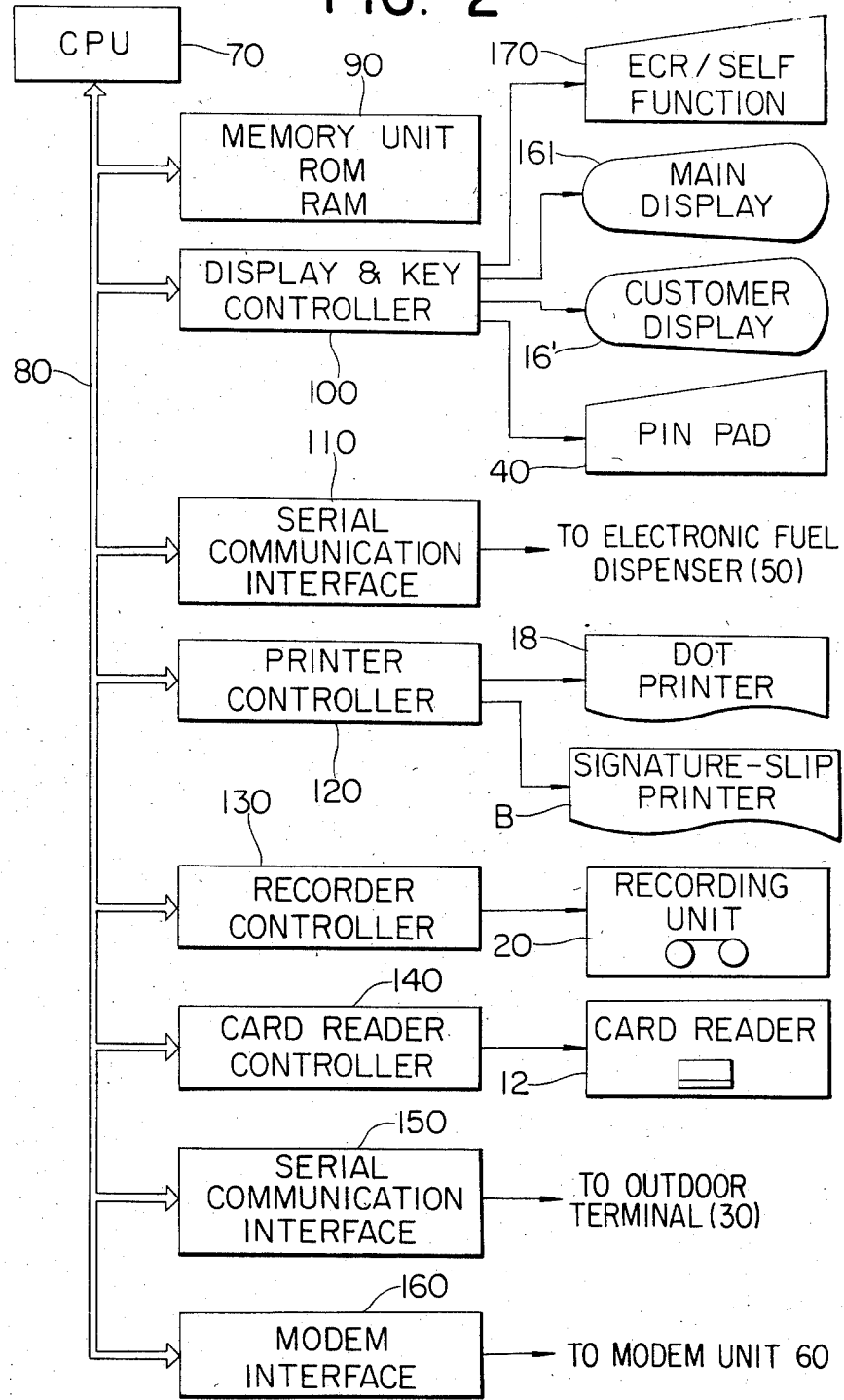
FIG. 2 is a block diagram for the system shown in FIG. 1.

The system 10 incorporates therein a control unit which will be explained hereinafter with reference to FIG. 2. The control unit comprises a central processing unit (CPU) 70 and such members associated with the central processing unit 70 through a common bus 80, as a memory unit 90 including a read-only memory (ROM) and a random access memory (RAM), a display and key controller 100, a serial communication interface 110 for the dispensers, a printer controller 120, a recorder controller 130, a card reader controller 140, another serial communication interface 150 for the outdoor terminal, and a modem interface 160. In the memory unit 90, the ROM stores various programs such as a setting-up pre-operation program, a fuel dispensation manner setting program, an alarm issuance monetary amount setting program, an initializing program, first and second business programs, a cash take-off progam, a responsible person shift program as well as a work closing program, and the RAM has various memory areas such as a fuel dispensation manner area, an alarm issuance monetary amount area, a registration code number area on a responsible person and name of merchandise, a change cash amount area, a presenting cash amount area, a dispensed fuel data area, a cash sales area, a credit sales area, a total sales area and an individual merchandise sales area. The display and key controller 100 controls a ECR/SELF function 170 which will be explained later with reference to FIG. 3, a main display 161, the customer's display 16' (FIG. 1) and the person identification number (P.I.N.) pad 40 (FIGS. 1 and 4). The serial communication interface 110 is connected to and controls one or more dispensers 50 (FIG. 1) and the other serial communication interface 150 is connected to and controls the outdoor terminal 30 (FIGS. 1 and 5). The printer controller 120 controls the dot printer 18 and the signature-slip printer B (FIG. 1). The recorder controller 130 and card reader controller 140 controls, respectively the recording unit 20 and card reader unit 12 (FIG. 1). The modem interface 160 is connected to and controls the modem 60 (FIG. 1) to feed data stored in the recording unit 20 to a remote data analysing station (not shown).

Figure 3:
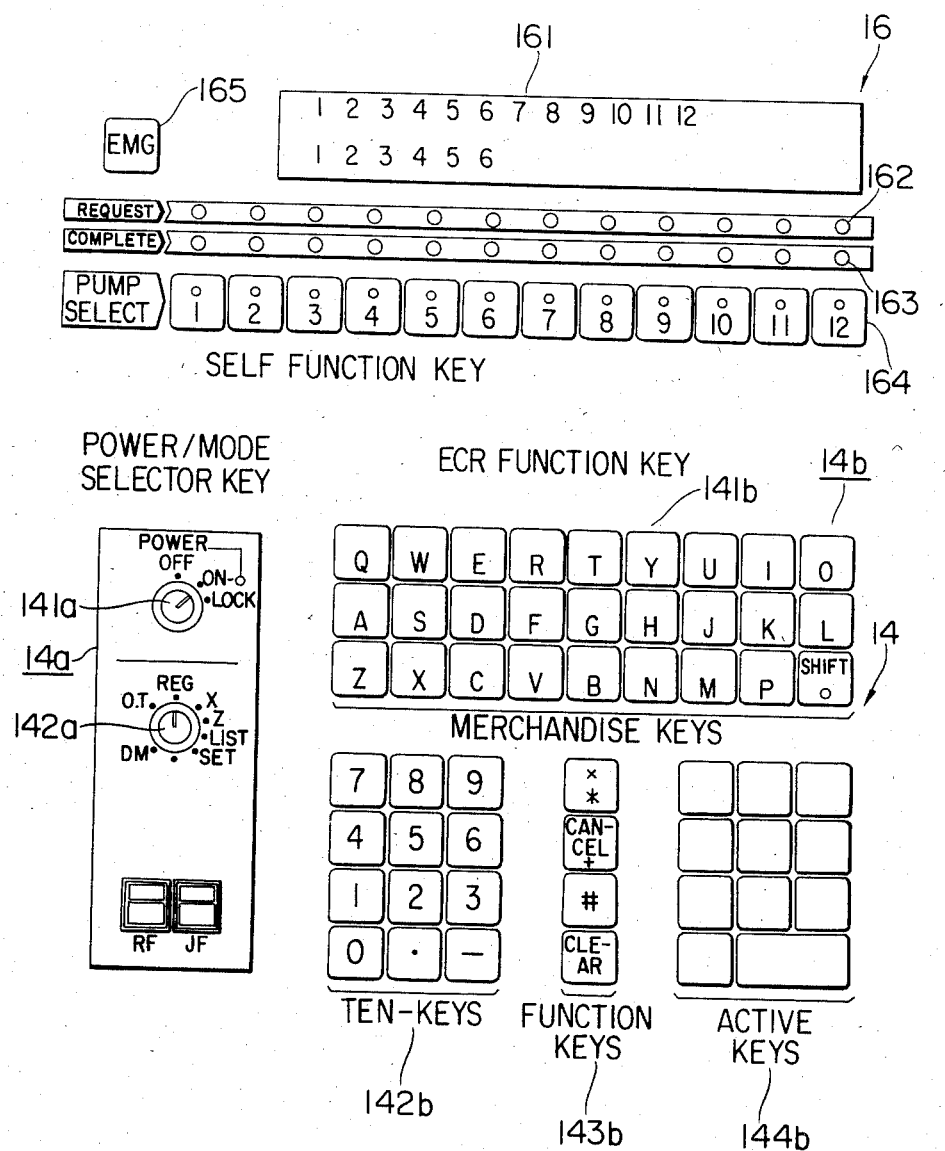
FIG. 3 is an illustration showing a data input/output key board and a display unit for the system shown in FIG. 1.

Referring now to FIG. 3, there are shown the key board 14 and fuel dispensation control panel 16 for the system 10 according to the invention. The key board 14 is divided into a power/mode selection key section 14a and an electronic cash register (ECR) funcion key section 14b. In the power/mode selection key section 14a, there are arranged a power key 141a, a mode selection key 142a, a receipt paper feed switch button RF for the printer, and a journal paper feed switch button JF for the printer. The power key 141a takes one of the following 3 positions.

OFF: shutting off the power,
ON: connecting the system with the power, and
LOCK: disabling any operation of the ECR function keys in the section 14b and providing for operation of self function keys to be referred to later.

The mode selection key 142a selects one of the following modes.

REG: for handling usual sales,
X: for providing registration of officer and outputing an office shift report,
Z: for outputing a daily report,
SET: for providing registration of requirements or conditions for the system,
LIST: for printing out the registered conditions,
DM: diagnostic mode to confirm whether or not the system is operating normally, and
OT: operation training mode.

There are two kinds of mode selection keys, namely a master key which selects one of the the all of said modes and a sub-key which can select only one of the REG, X and OT modes.

The ECR function key section 14b is subdivided into key groups of merchandise keys 141b for inputing coded merchandise and alphabetical letters, ten keys 142b for inputing numeral data, function keys 143b for calculation and others, and active keys 144b to be used for various treatments.

The fuel dispensation control panel 16 comprises a main display 161 which has an alphanumeric part to be used for making confirmation of an inputed data, displaying the content of memory and the like, and a machine status part to be used for indicating a state of possible error in input/output machine; a plurality or request lamps (REQUEST) 162 to be flickered when a customer or station operator disengages a fuel dispensing nozzle from a concerned dispenser; a plurality of completion lamps (COMPLETE) 163 to be lit-up when dispenser operator puts the fuel dispensing nozzle on a nozzle hanger of the dispenser; a self function keys (PUMP SELECT) 164 which consist of a plurality of push buttons to be pressed down in response to customer's request which can be confirmed by the officer by lightening (flickering) of the concerned request lamp 162; and an emergency key (EMG) 165 which is a push button to be pressed down to urgently stop fuel dispensation of all dispensers.

Figure 4:
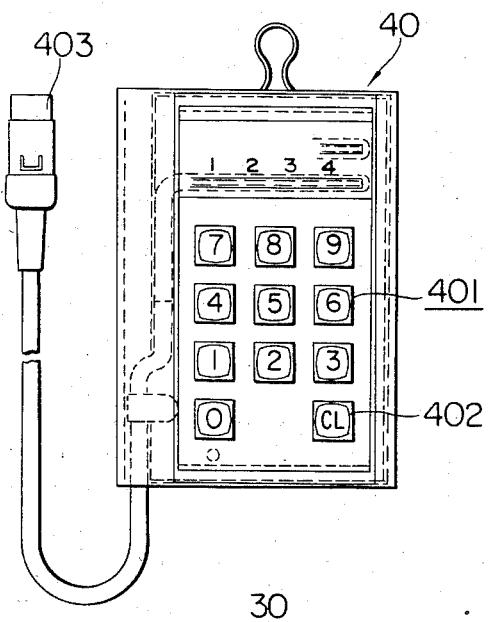
FIG. 4 is a plan view of a personal identification number pad to be connected to the system as shown in FIG. 1.

FIG. 4 is a front view of the personal identification number (PIN) pad 40 to be used in addition to the personal card to definitely identify a customer. The PIN pad is provided with ten-keys 401 and a clear key (CL)

402 so that the customer can input his coded number (usually 4 digits), and further with lamps for confirming the input by lighting-up thereof, and a connector 403 to the main body A of the system.

Figure 5:
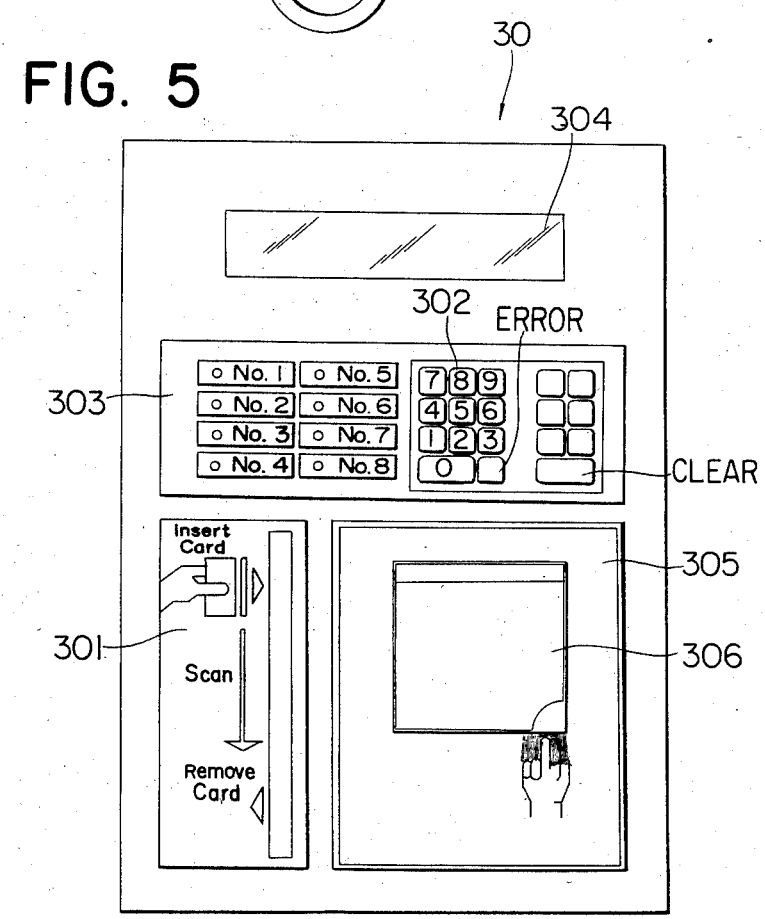
FIG. 5 is a vertical front view showing an outdoor terminal to be connected to the system as shown in FIG. 1.

FIG. 5 illustrates details of the outdoor terminal 30 shown in block in FIG. 1. The outdoor terminal 30 comprises a card reader 301 interconnected with the card reader 12 of the system 10 (FIG. 1), ten-keys 302 for selecting one of the dispensers and if necessary inputing a coded customer number similar to the PIN pad 40 as shown in FIG. 4, a plurality of dispenser indication lamps 303 one of which is adapted to be lit-up by pushing any one of the ten-keys 302, a display 304 for indicating the inputed data and various messages, and a printer 305 which is interconnected to the printing unit 18 in the system 10 and issues a receipt, if necessary.

Self service fuel dispensing operation steps utilizing the outdoor terminal 30 will be explained hereinafter with reference to FIGS. 1, 3 and 5.

(1) A customer inserts his card in the card reader 301 (The card reader 301 operated synchronized with the card reader 12 in the system checks the card and if the card is invalid, an error message will be indicated in the displays 304 of the outdoor terminal), (2) If he wishes to obtain a receipt, he lifts up a lid 306 covering a receipt exit (The system 10 accepts the receipt issue request), (3) If the card is to be additionally identified with a code number, he inputs his PIN code by using the ten-keys 302 (The ten-keys are interconnected with of PIN pad 40 (FIG. 4) and if the number is not correct, a corresponding error message will be indicated on the display 304), (4) He selects and designates an unoccupied dispenser and inputs the dispenser number by using the ten-keys 302, (5) He disengages a dispensing nozzle of the selected dispenser (A concerned request lamp 162 flickers and an officer in the office cabin approves the request by pushing down the concerned self function key 164 so that the lamp 162 lights-up continuously and the dispenser is made in a set-up state), (6) He operates a trigger of the nozzle to dispense the fuel to his vehicle (The dispensing fuel amount is momentarily indicated on a display for the dispenser and stored in the momory for the system 10), (7) Upon completion of the fuel dispensation, he puts the nozzle on a hanger of the dispenser (The sales data is stored by the recording unit 20. And, if the receipt issue request as referred to in Item 2 has been made, a signal is issued from the system 10 to the printer 305 in the outdoor terminal to issue a receipt after reading again the card by the card reader 301).

The invention will now be further explained with regard to executions of each program employed for the system according to the invention, with reference to FIGS. 6 to 14.

For executing specified one of the programs to be referred to hereinafter, the mode selection key 142a will be turned to take its "REG", "X", "Z" "SET" or "LIST" position, as stated before in connection with operation modes, but the following descriptions shall be made under an assumption that the key takes the position of either "SET" or "REG", for the sake of simplicity.

Figure 6A:
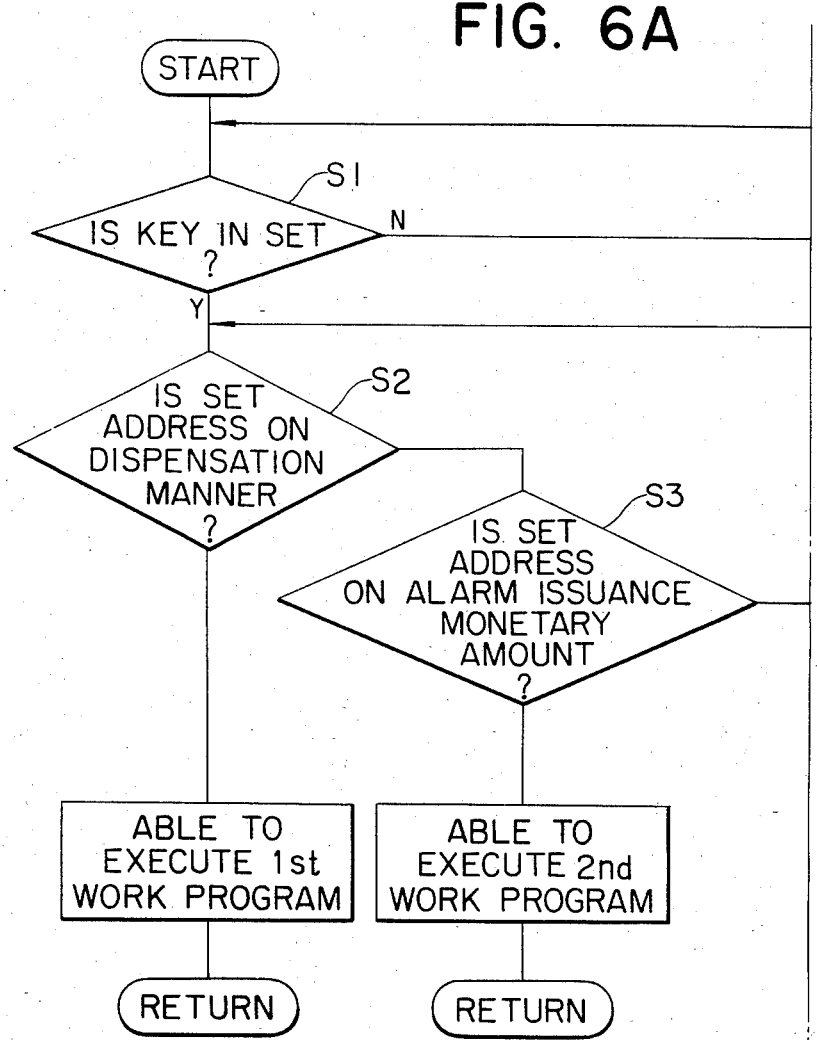
FIGS. 6A, 6B and 6C are to be combined as in FIG. 6 to show a flow diagram of pre-operations for setting-up an execution of various programs.
Figure 6:
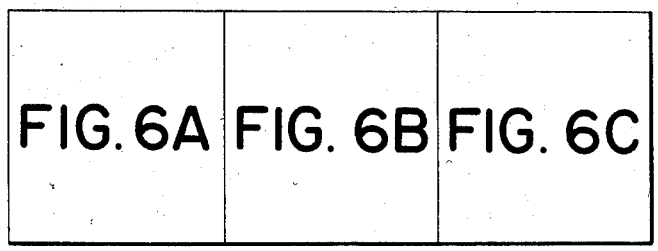
Figure 6B:
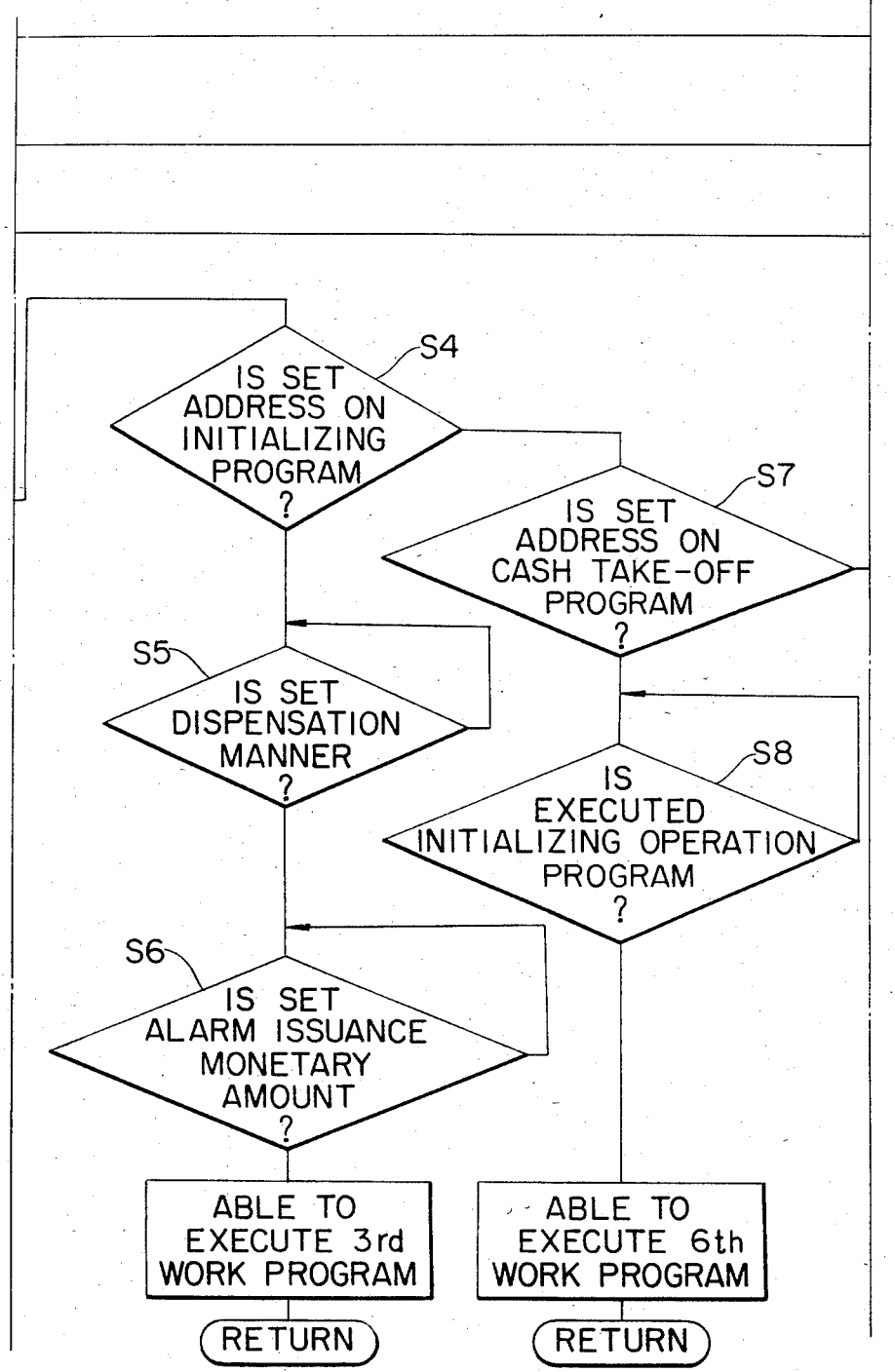
Figure 6C:
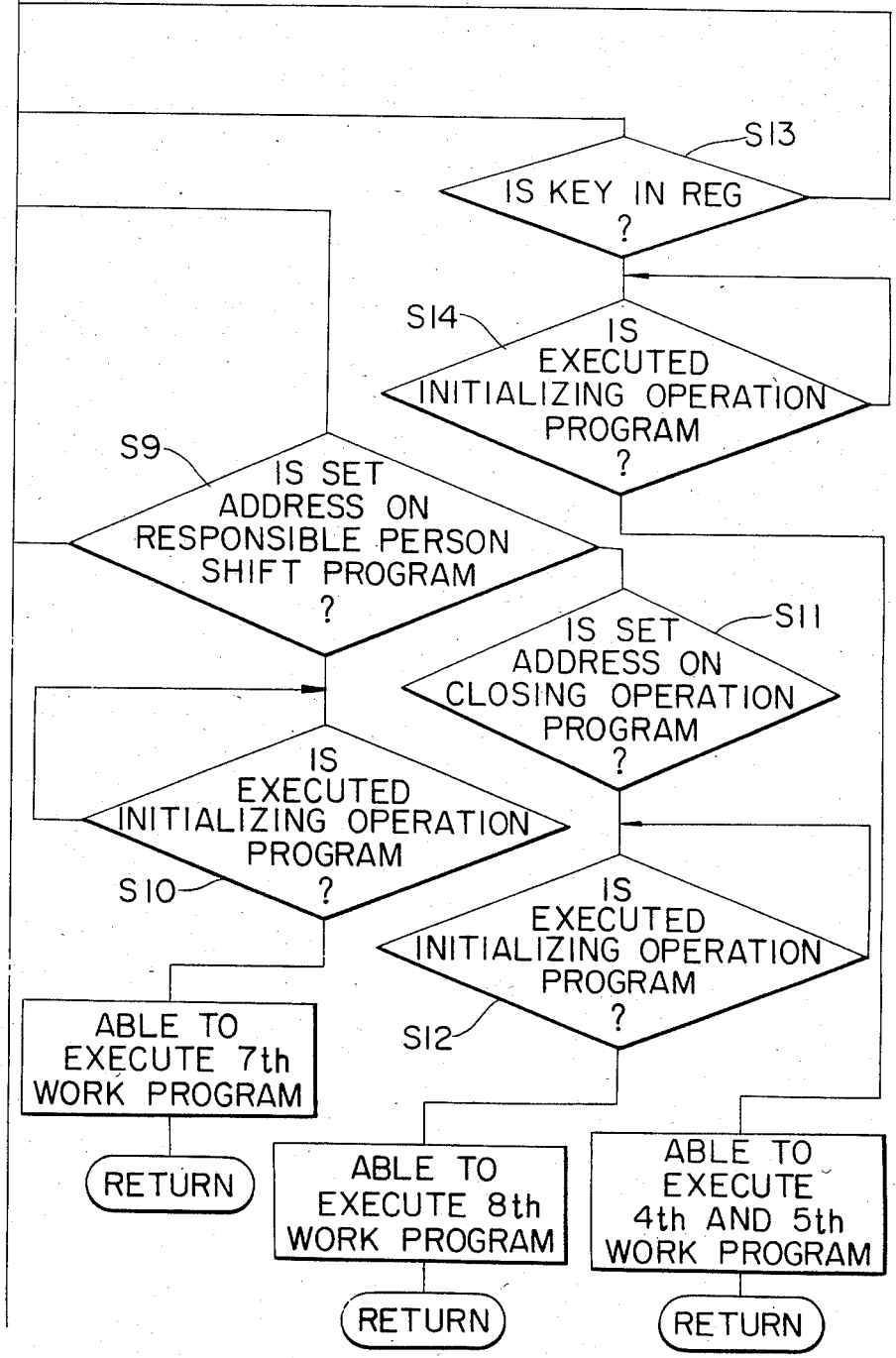
Figure 7:
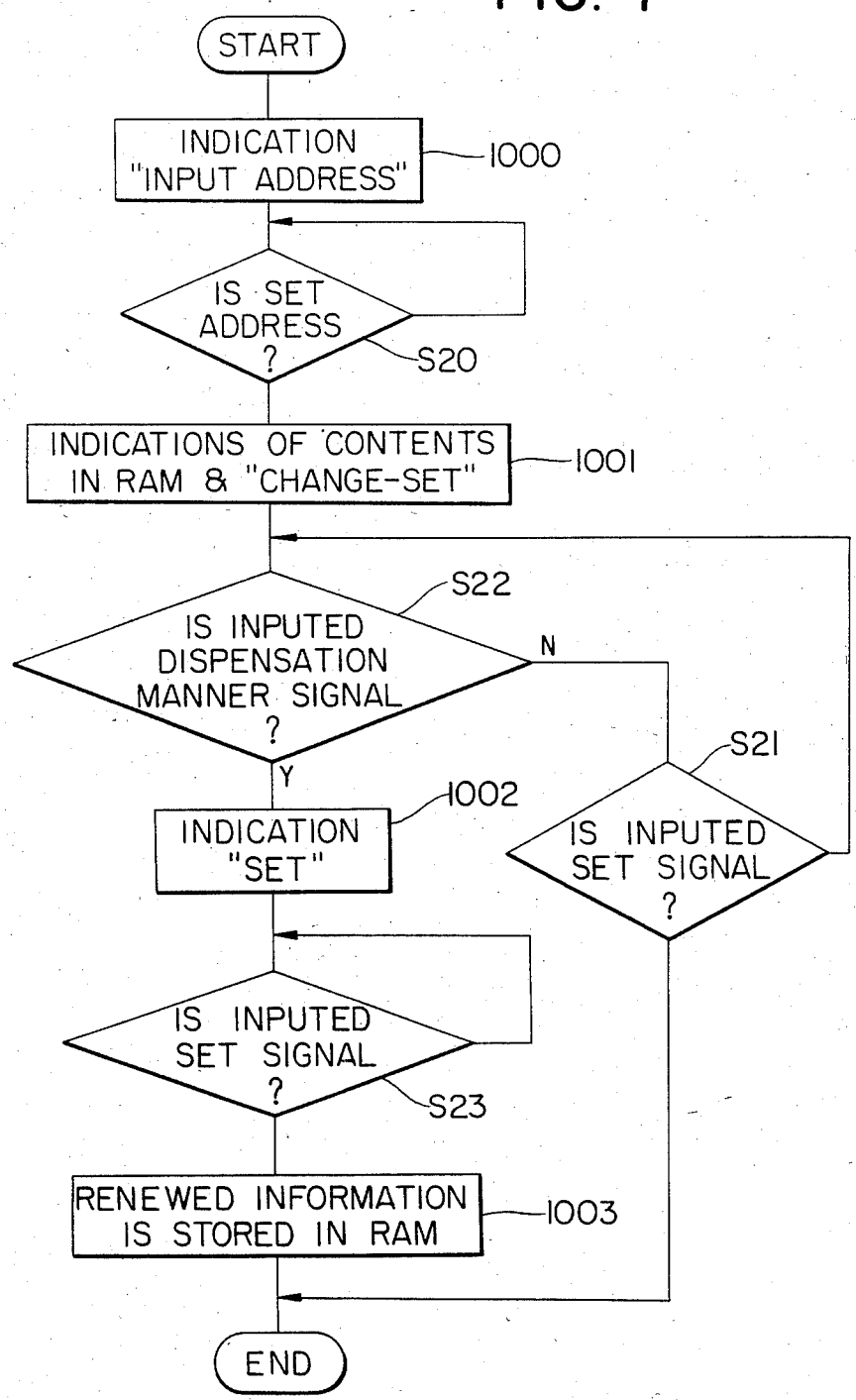
FIG. 7 is a flow diagram showing a sequence on execution of a fuel dispensation manner setting program.

FIG. 6 shows a flow diagram of a pre-operation for setting up one of the executions of a particular work program shown in FIGS. 7 to 14. This pre-operation program is started by inserting and turning the power key 141a to its ON-position. As the first step $S_1$, it is judged whether the mode selection key 142a is in a position of SET or not. If the key is in the SET-position, it is judged whether or not an address procedure on fuel dispensation manner should be made, as a second step $S_2$. If the address procedure should be made, this makes it possible to execute a fuel dispensation manner setting program (1st Work Program) as shown in FIG. 7, which will be explained later. If the address procedure should not be made, it is judged whether or not an address procedure on an alarm issuance monetary amount should be made, as a third step $S_3$. If the address procedure should be made, this makes it possible to execute an alarm issuance monetary amount setting program (2nd Work Program) to be referred later in reference to FIG. 8. If this address procedure should not be made, it is judged whether or not an address procedure on an initializing operation should be made, as a fourth step $S_4$. If the initializing address procedure should be made, the fuel dispensation manner setting operation and the alarm issuance monetary amount setting operation have subsequently been made as fifth and sixth steps $S_5$, $S_6$ to make it possible to execute an initializing program (3rd Work Program) to be referred later in reference to FIG. 9. If the initializing address procedure should not be made, it is judged whether or not an address procedure on a cash take-off operation should be made, as a seventh step $S_7$. If the cash take-off address operation should be made, the initializing operation is executed as an eighth step $S_8$, to make it possible to execute a cash take-off program (6th Work Program) to be referred later in reference to FIG. 12. If the cash take-off address procedure should not be made, it is judged whether or not an address procedure on a responsible person shift operation should be made, as a ninth step $S_9$. If the responsible person shift address procedure should be made, the initializing operation is executed as a tenth step $S_{10}$, to make possible a responsible person shift program (7th Work Program) to be referred later in reference to FIG. 13. If the responsible person shift address procedure should not be made, it is judged whether or not an address procedure on a work closing operation should be made, as an eleventh step $S_{11}$. If the working closing address procedure should be made, the initializing operation is executed as a twelfth step $S_{12}$, to make it possible to execute a work closing program (8th Work Program) to be referred later in reference to FIG. 14.

While if the mode selection key 142a is not in the SET-position, it is judged whether the key is in the REG-position or not, as a thirteenth step $S_{13}$. If the key is in its REG-position, the initializing operation is executed as a fourteenth step $S_{14}$ so as to make it possible to execute either one of first and second business programs (4th and 5th Work Programs) to be referred later in reference to FIGS. 10 and 11.

1st Work Program (Fuel Dispensation Manner Setting Program, FIG. 7)

This programed operation is started by turning the mode selection key 142a to its SET-position. The main display 161 (FIG. 3) indicates "input address" (1000) and thus an officer inputs with use of the ten-keys 142b (FIG. 3) an address for the fuel dispensation manner (step $S_{20}$). This makes the system to be operated in accordance with the fuel dispensation manner setting program of the ROM in the memory unit 90—FIG. 2. The main display 161 indicates a content of fuel dispensation manner area in the RAM, namely "pre-payment", "post-payment" or "attendant" and whether a change thereof is required or not, as shown by reference numeral 1001). If there is required no change in the displayed fuel dispensation manner, the officer inputs a set signal in Step $S_{21}$ to finish this program. If he wishes to change the displayed manner, he inputs a signal on a new fuel dispensation manner with use of the ten-keys, for instance, 1 for pre-payment, 2 for post-payment and 3 for attendant (step $S_{22}$). In this case, the main display indicates necessity of the set signal inputing, as shown by reference numeral 1001. Therefore, the officer inputs the set signal in step $S_{23}$ to renew the memory in the RAM, as shown by reference numeral 1003 and finish the program.

This program will be executed for each dispenser, when a fuel dispensation manner is changed from a preceding one.

Figure 8:
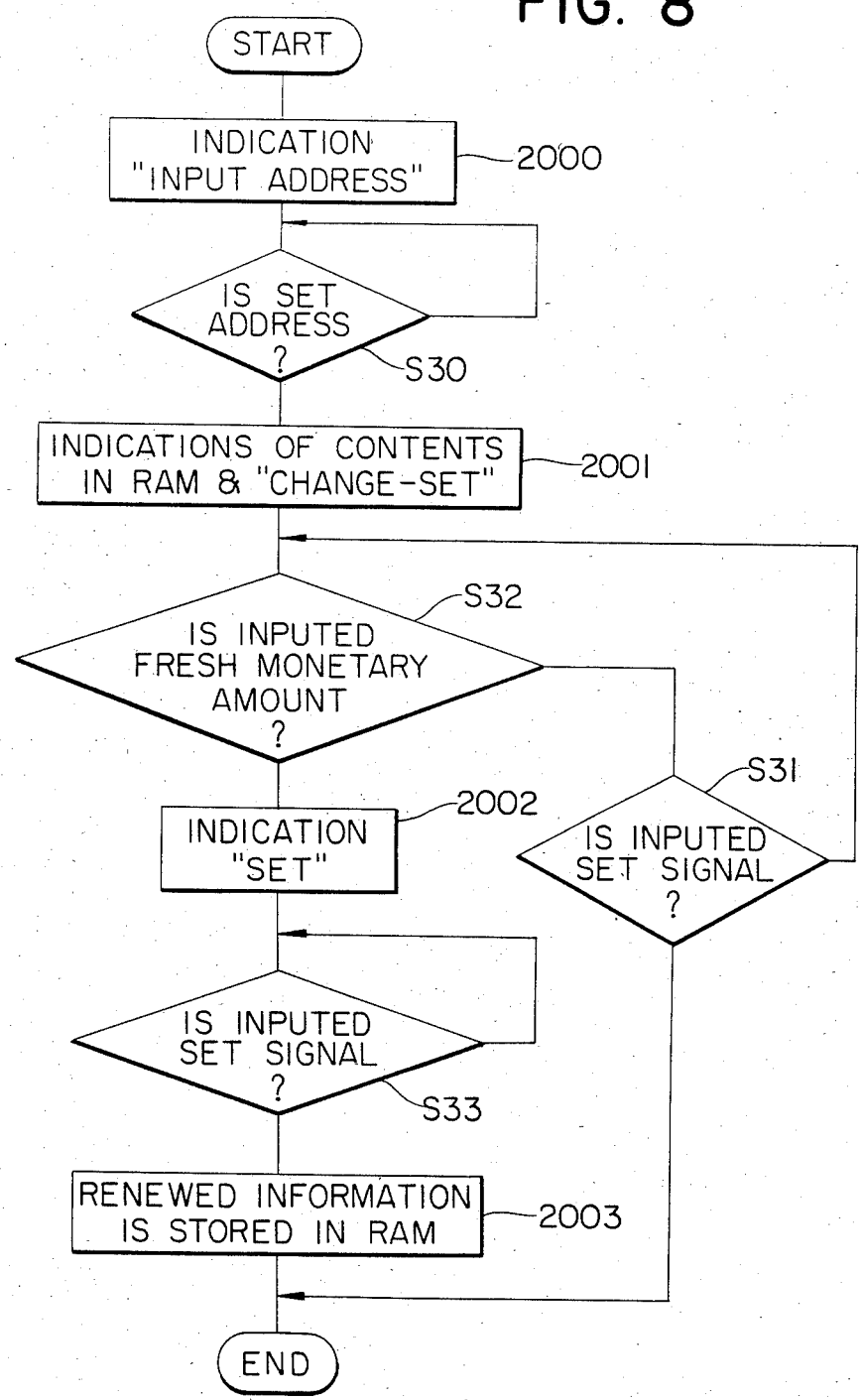
FIG. 8 is a flow diagram showing a sequence on execution of an alarm issuance monetary amount setting program.

2nd Work Program (Alarm Issuance Monetary Amount Setting Program, FIG. 8)

The flow of this program is substantially the same as that of the 1st Work Program.

This programed operation is started by turning the mode selection key 142a to its SET-position. The main display 161 indicates "input address" (2000) and thus an operator inputs with use of the ten-keys 142b an address for setting the alarm issuance monetary amount (step $S_{30}$), whereby the system operates according to an alarm issuance monetary amount setting program of the ROM in the memory unit 90. Then the main display 161 indicates a content of alarm issuance monetary amount area in the RAM, namely a pre-set monetary amount and whether a change thereof is required or not, as shown by reference numeral 2001. If there is required no change in the displayed monetary amount, the officer inputs a set signal in step $S_{31}$ to finish this program. While if he wishes to change the monetary amount, he inputs a signal on a new monetary amount with use of the ten-keys 142b in step $S_{32}$. The main display 161 indicates the input monetary amount and requests its set operation, as shown by reference numeral 2002. In response to the request, the officer inputs a signal for setting the new monetary amount as step $S_{33}$ to renew the memory of concerned area in the RAM in order to finish the program.

Please note that this program will be executed only when the alarm issuance monetary amount should be changed. This program is set for the system to inform a station officer that a total cash amount in the cash box exceeds a predetermined amount to call upon him to take some cash out of the cash box so as to avoid a possible robbery.

3rd Work Program (Initializing Operation Program, FIG. 9)

Operations for this program make it possible to handle sales and should be executed at the time of beginning of daily business and changing or shifting a responsible person in the station.

This programmed operation is started by turning the mode selection key 142a to its SET-position. The main display 161 indicates "input address" (3000) and thus an officer inputs an address of a registered number of responsible person (step $S_{40}$) by using the ten-keys 142b (Then the system operates in accordance with an initializing operation program of the ROM). The officer checks whether or not the 1st and 2nd Work Programs have been executed. If the programs have not been executed, the main display 161 indicates an error message, and if those have already been executed, the main display then indicates "input registration number", as shown by reference numeral 3001. The officer inputs the registration number for identifying him as step $S_{41}$. The main display indicates the inputed registration number and requests its setting operation, as shown by reference numeral 3002. In response to the request, the officer inputs a setting signal thereon as step $S_{42}$. This will be stored in the registration number area of the RAM and the main display 161 indicates "input address" on a change cash, as shown by reference numeral 3003 and thus the officer inputs the address for the change cash, as step $S_{43}$. The main display 161 indicates "input change cash amount", as shown by reference numeral 3004 and thus he inputs the amount of cash as prepared for change, as step $S_{44}$. In response to its setting operation request (3005) to be displayed on the main display 161, he inputs a setting signal theron in step $S_{45}$ to finish the program. Upon completion of the step $S_{45}$, a cash box 22 (FIG. 1) is automatically opened to accommodate the cash for change and concurrently therewith, the inputed cash amount is stored both in the change cash area and the present cash amount area of the RAM and registered in the recording unit 20 together with the responsible person's registration number, as shown by reference numeral 3006 so that sales treatment is made possible.

Figure 10:
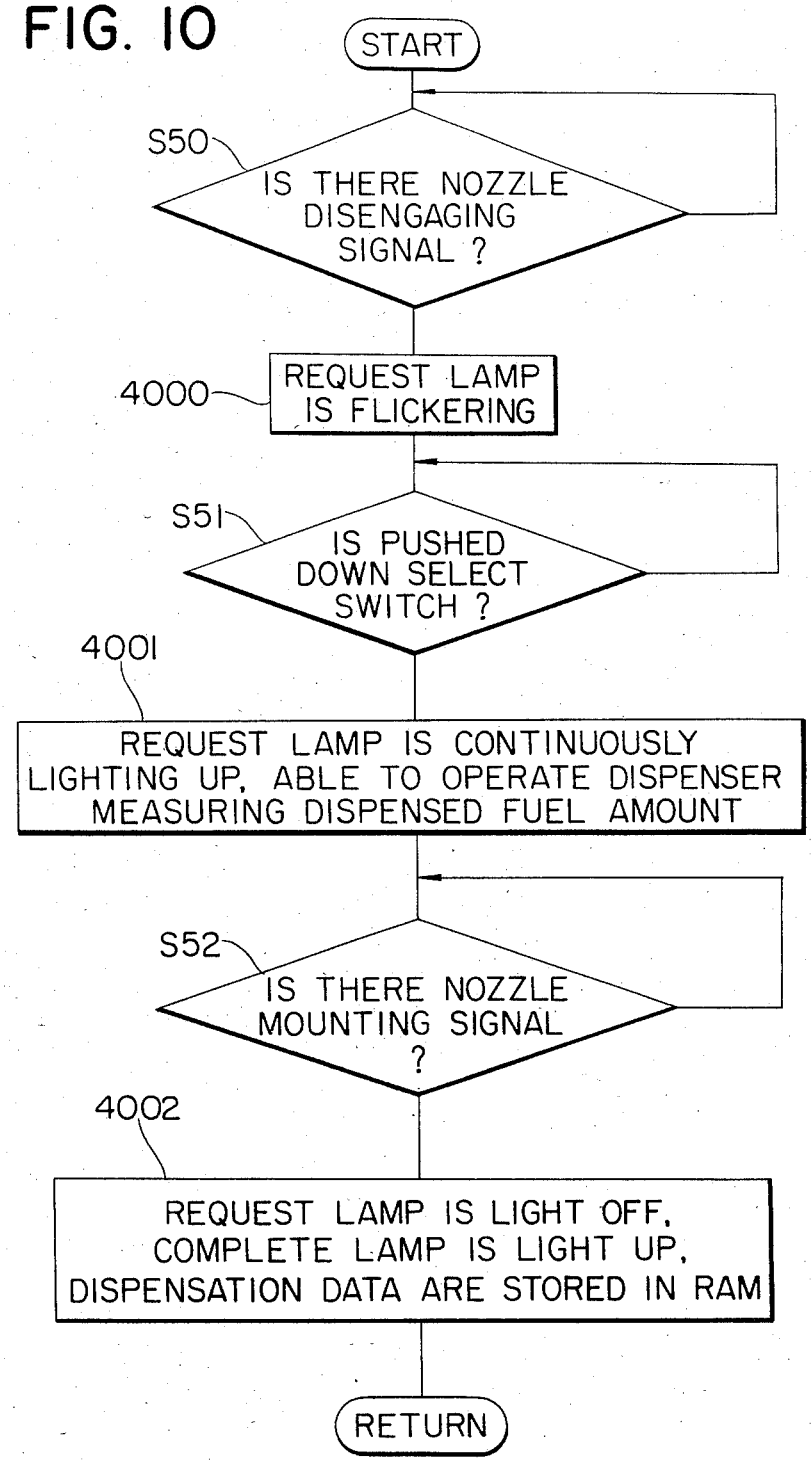
FIG. 10 is a flow diagram showing a sequence on execution of a first business program (fuel dispensation)

4th Work Program (Program for Post-Payment Self Service Fuel Dispensing Operation, FIG. 10)

After having made the 3rd Work Program, the mode selection key 141a (FIG. 3) is in its REG-position (see also the flow diagram in FIG. 6).

If a customer disengages a dispensing nozzle from its holder of the dispenser 50, a nozzle disengaging signal is sent from the dispenser to the system 10 as shown in step $S_{50}$ to cause flickering of the concerned request lamp 162, as shown by reference numeral 4000. In response thereto, the officer in the cabin pushes down a concerned pump selection key or button 164 to actuate the concerned dispenser, as shown in step $S_{51}$. As shown by reference numeral 4001, the state of the request lamp 162 changes from its flickering to a continuous lighting up, the customer can dispense the fuel to his vehicle by actuating a trigger of the dispensing nozzle and a flow pulse from a flow meter incorporated in the dispenser is counted by a counter to indicate the dispensed fuel amount on the concerned indicator. When engaging the dispensing nozzle on its holder after completion of the fuel dispensation, as shown in step $S_{52}$, a corresponding signal is sent from the dispenser 50 to the system 10 to light out the request lamp 162 and light up a concerned fuel dispensation completion lamp 163, as shown by reference numeral 4002. In this case, the dispenser number, dispensed fuel amount and the like fuel dispensation data are stored in the dispensation data area of the RAM to finish this program. Then the customer goes to the office cabin for clearing the charge.

In case of pre-payment self service operation, a customer goes to the office cabin for previous clearance to ask a station officer for obtaining a designation of a specified dispenser, a pre-setting thereof by a monetary amount or a fuel amount to be dispensed, and an actuation of the dispenser, as an admission of the fuel dispensation.

Figure 11A:
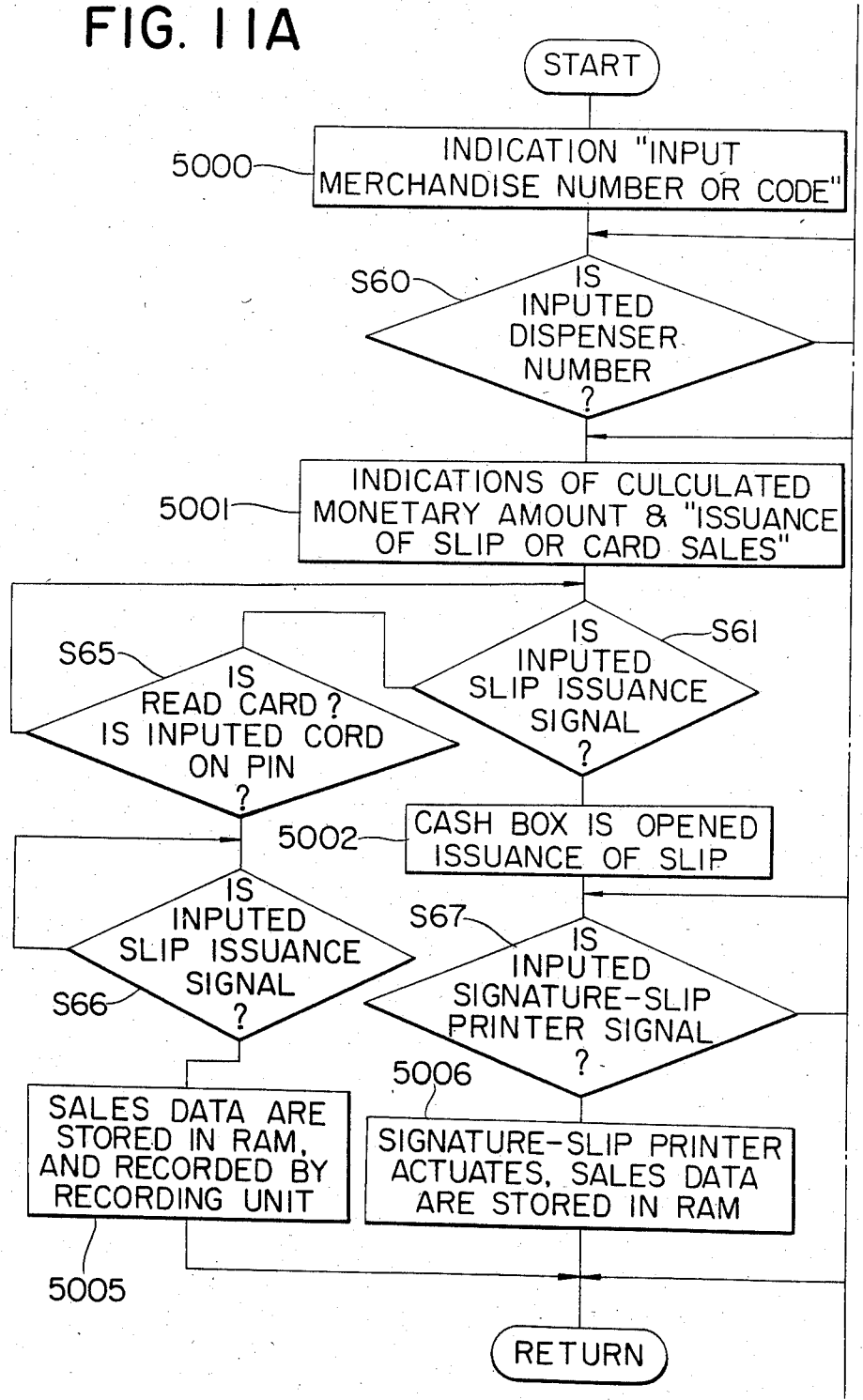
Figure 11B:
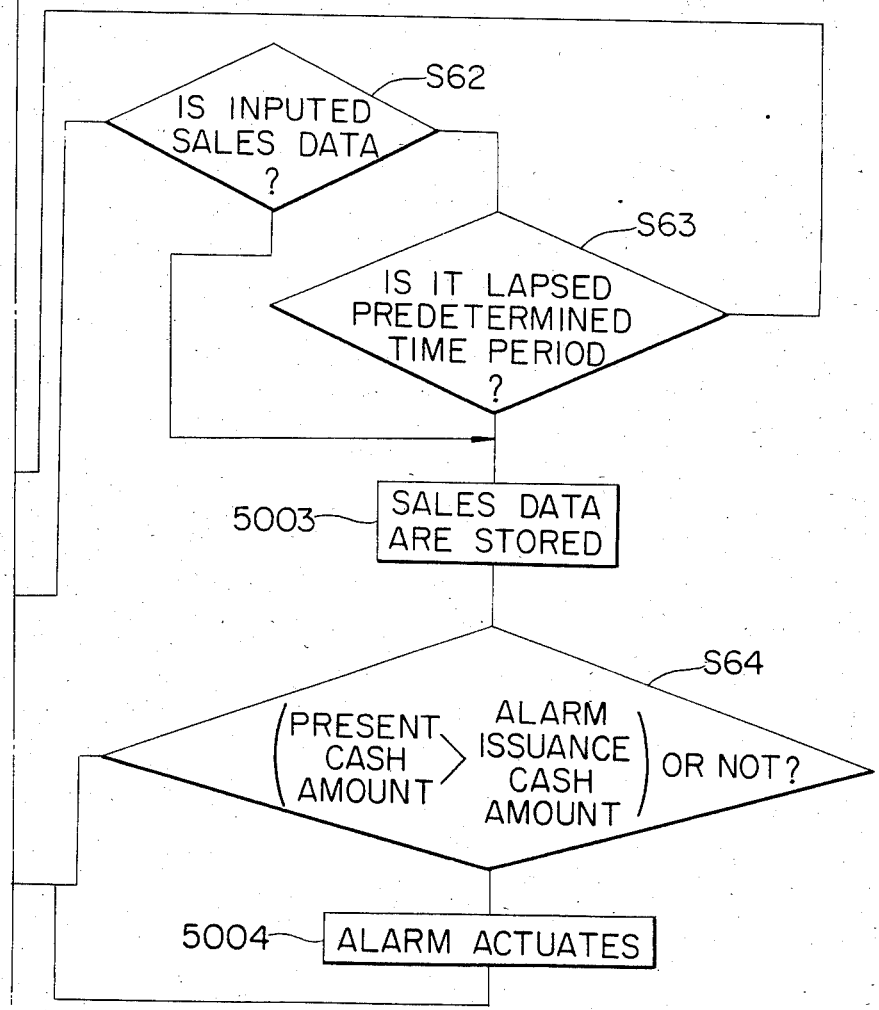

5th Work Program (Various Sales Handling Program, FIG. 11)

After having made the 3rd Work Program, the mode selection key 141a (FIG. 3) is in its REG-position (see also the flow diagram in FIG. 6). This program is divided into sales of a fuel and merchandise other than fuel, the sales being further divided into those in cash and credit transactions.

In the first place, a cash transaction handling of fuel will be explained hereinafter. This is started by the main display 161 indicating "input merchandise code", as shown by reference numeral 5000. This is fuel sales and thus an officer presses down the pump selection button 164 to actuate the concerned dispenser ($S_{60}$). Having finished a fuel dispensation operation, the concerned dispensation completion lamp 163 is lit-up. The main display 161 indicates a calculated monetary amount and requests "slip printing or card reading?", as shown by reference numeral 5001. Then the officer inputs in step $S_{61}$ a signal for printing out a slip by the printing unit 18, which causes an opening of the cash box 22 and printing out of concerned data on the slip, as shown by reference numeral 5002. In this case, the officer may input sales data on another customer to print out the data on a slip, as shown in step $S_{62}$. After the lapse of a predetermined time period (step $S_{63}$) from the step $S_{61}$ (any additional sale has not yet been made), the sales or total sales data will be stored in the cash sales area, total sales area, individual merchandise sales area and present cash amount area of the RAM, as shown by reference numeral 5003, and if the newly stored present cash amount exceeds a predetermined set amount, $S_{64}$, a concerned signal is issued to inform the fact to the officer, as shown by reference numeral 5004 so that the officer can take off a suitable cash amount from the cash box 22 for its custody in another safety cash box, as explained in detail in reference to the next Work Program.

In a credit sale, a card with a magnetic strip is read by the card reader 12 and if necessary a coded number is inputed by the PIN pad 40 in a office cabin, as step $S_{65}$, in lieu of the slip printing out signal input operation as shown by the step $S_{61}$ for cash sales, and then slip printing out signal is inputed as a step $S_{66}$ to store the sales data in the credit sales area, total sales area and individual merchandise sales area of the RAM and record the sales and card data by the recording unit 20 for post-demanding thereon, as shown by reference numeral 5005.

In another credit sale by a non-magnetic card (an embossed card), the officer inputs a signal for actuating the signature-slip printer B, as step $S_{67}$, after having inputed the slip printing out signal (step 61) to print out a credit sale slip and store the sales data in the credit sales area, total sales area and individual merchandise sales area of the RAM, as shown by reference numeral 5006. The step $S_{67}$ should be taken after the step $S_{61}$ and before the steps $S_{62}$, $S_{63}$.

In case of sales of other than fuels, the officer inputs a code for identifying a sold merchandise as shown with step $S_{68}$, in lieu of the input operation of dispenser number (step $S_{60}$). In response to a request indicated on the main display 161 as shown by reference numeral 5007, the officer then inputs a unit price of the merchandise as step $S_{69}$ and subsequently inputs a number thereof as step $S_{70}$ in response to its request to be indicated on the main display 161, as shown by reference numeral 5008. Then the main display 161 indicates a calculated monetary amount based on such inputed data, as shown by reference numeral 5001. Subsequent operations are same with those for the cash or credit sales as explained hereinbefore.

Figure 12:
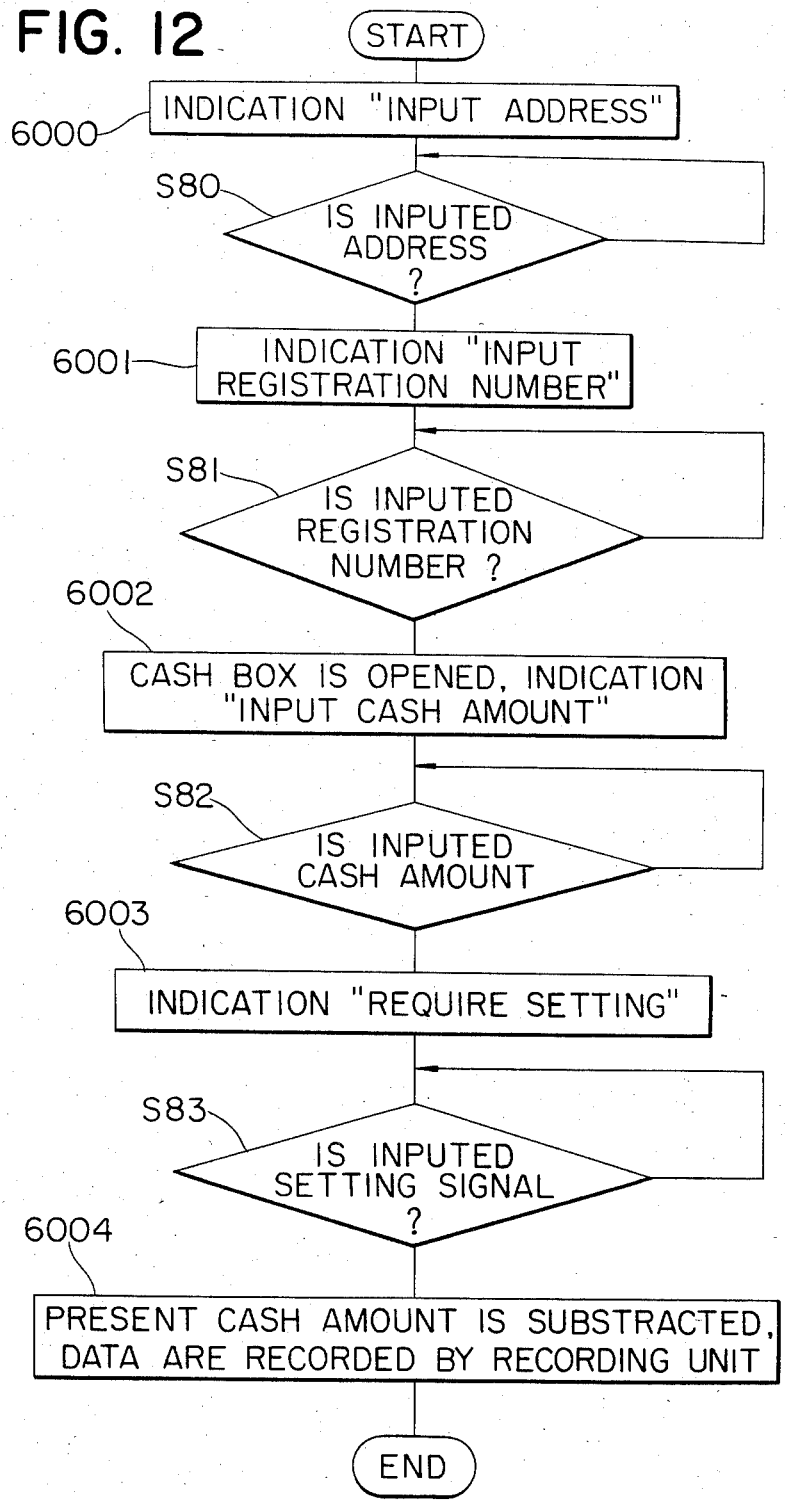
FIG. 12 is a flow diagram showing a sequence on execution of a cash take-off program.

6th Work Program (Cash Take-Off Program from Cash Box, FIG. 12)

This program is executed when an alarm is issued through the step $S_{64}$ in the 5th Work Program.

This programed operation is started by turning the mode selection key 142a to its SET-position. The main display 161 indicates "input address" (6000) and thus the officer inputs an address for the cash take-off program (step $S_{80}$) by using the ten-keys 142b, whereby the system operates according to a cash take-off program of the ROM in the memory unit 90. After having made the 3rd Work Program, the main display 161 indicates "input registration number" (6001). In response thereto, the officer operates the ten-keys 142b to input his registered number as one of responsible persons (step $S_{81}$), which causes an opening of the cash box 22 to allow for him to take-off the cash from the cash box 22 and in this case, the main display indicates "input taken-off cash amount" (6002). The officer then inputs the cash amount (step $S_{82}$) and a setting signal (step $S_{83}$) in response to a request thereof (6003) indicated on the main display 161, whereby a subtraction on the present cash amount is executed to store the calculated cash amount in the concerned area of the RAM and record the same together with the responsible person's registration number by the recording unit 20, as shown by reference numeral 6004.

The cash taken-off from the cash box will be kept in another safety cash box or brought to a bank.

Figure 13:
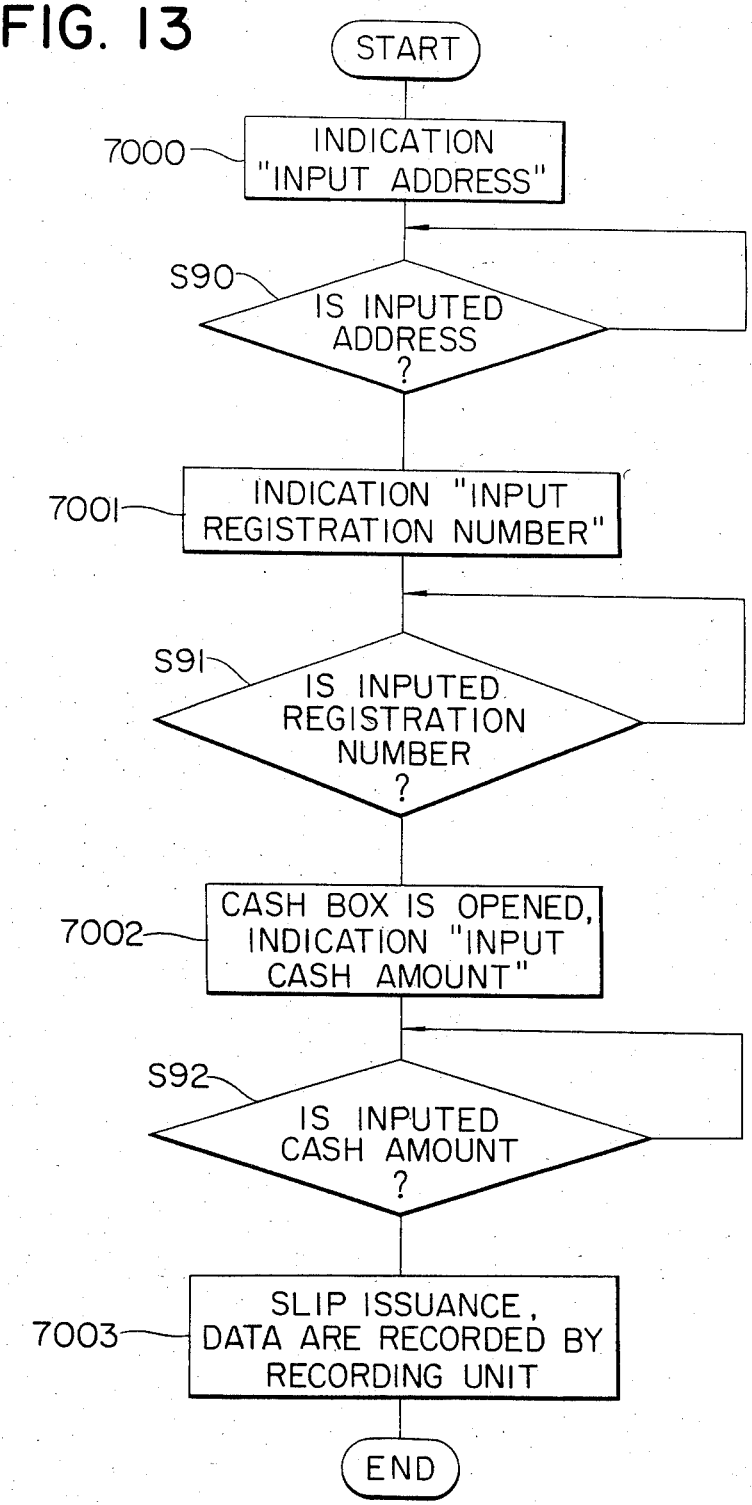
FIG. 13 is a flow diagram showing a sequence on execution of a responsible person shift program.

7th Work Program (Program on Responsible Person Shift, FIG. 13)

This programed operation is executed in each shift or change of a responsible person.

The mode selection key 142a is turned to its SET-position. The main display 161 indicates "input address" (7000) and thus an officer inputs with use of the ten-keys 142b an address for the responsible person shift program (step $S_{90}$), whereby the system operates according to a responsible person shift program of the ROM in the memory unit 90. Then he inputs his registered number (step $S_{91}$), in response to a request (7001) indicated on the main display 161, which causes an opening of the cash box 22. The officer counts the cash in the cash box 22 and inputs the counted cash amount (step $S_{92}$) with use of the ten-keys 142b, in response to a request (7002) indicated on the main display 161, to issue a printed slip on concerned sales to the officer, record all of said data by recording unit 20 and erase memories on the officer's registration number and said sales data in the RAM.

It is noted that the execution of this program makes it impossible to execute any of business the programs as shown in FIGS. 10 and 11 and thus the 3rd Work Program (Initializing Operation Program, FIG. 9) should be executed prior to the business program as shown in FIG. 10 or 11.

Figure 14:
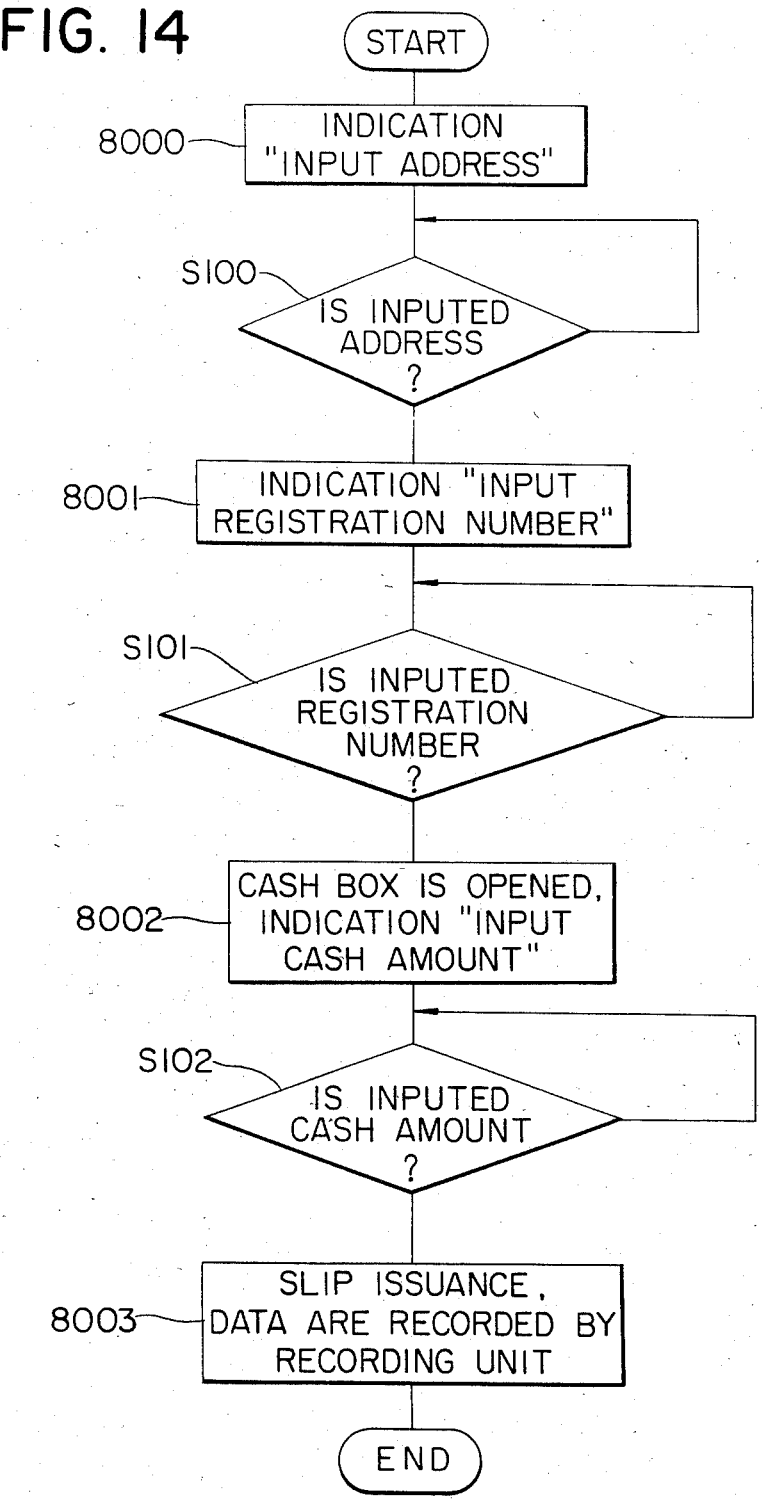
FIG. 14 is a flow diagram showing a sequence on execution of a work closing program.

8th Work Program (Work Closing Operation Program, FIG. 14)

This programed operation is substantially the same as that for the responsible person shift program as shown in FIG. 13 (the 7th Work Program), excepting that a total sales slip of the day is printed out in addition to a printed slip on concerned sales to an officer who executes this program.

The mode selection key 142a is turned to its SET-position. The officer inputs an address of the closing operation program (step $S_{100}$), in response to a request (8000) indicated on the main display 161, whereby the system operates according to a closing operation program on the ROM in the memory unit 90. After having made the 3rd Work Program, he inputs his registration number as one of responsible persons (step $S_{101}$) in accordance with instructions (8001) given in the display 161, which causes an opening of the cash box 22. The officer takes-off the all cash in the cash box 22 to account and inputs the counted cash amount (step $S_{102}$) with use of the ten-keys 142b, in accordance with instructions (8002) indicated on the display 161, to issue printed slips on concerned sales to the officer and total sales on the day, record all of said data by the recording unit 20 and erase memories on the officer's registration number and said sales data in the RAM (8003).

The cash taken-off from the cash box 22 will be kept in another safety cash box or brought to a bank.

We claim:

1. A data input/output system for gasoline stations, comprising a fuel dispensation control panel having a fuel dispensation request lamp operated by a fuel dispensation request signal from a concerned fuel dispenser, a fuel dispensation permission switch for making operable the concerned dispenser, and a fuel dispensation completion lamp operated by a signal from the concerned dispenser; a key board for inputing sales data of dispensed fuel and other merchandise; a display for indicating said data; a printer for printing said data on a slip; a cash box for accommodating cash, checks and the like; alarm means for issuing an alarm signal; and a control unit having a central processing unit (CPU), a memory unit, a display and key controller, a serial communication interface for the fuel dispensers, and a printer controller, said memory unit having an alarm issuance monetary amount area in which a predetermined amount of money is memorized along with means for setting in said predetermined amount in said alarm issuance monetary amount area, said memory unit also having an area for recording the existing amount of cash accommodated in the cash box, said central processing unit having means for arithmetically increasing and decreasing the record of the amount of cash in the existing amount recording area corresponding to the amount of cash placed into and taken out of the cash box, and means for comparing said recorded amount of cash with said predetermined amount of money in the alarm issuance monetary area at each change in the recorded amount of cash and to issue a signal when the former amounts exceeds the latter amount so as to actuate said alarm means.

2. A data input/output system as claimed in claim 1, wherein the printer consists of a dot printer and a signature-slip printer.

3. A data input/output system as claimed in claim 1, wherein said control unit further has a controller for a card reader for use in credit sales.

4. A data input/output system as claimed in claim 1, wherein said memory unit comprises a read only memory (ROM) storing at least a setting-up pre-operation program, a fuel dispensation manner setting program, an alarm issuance monetary amount setting program, an initializing program, first and second business programs which include a sale operation other than a credit sale program, a cash take-off program, a responsible person shift program and a work closing program; said memory unit further comprising a random access memory (RAM) having at least a fuel dispensation manner area, said alarm issuance monetary amount area, a registration code number area, a change cash amount area, a present cash amount area, a dispensed fuel data area, a cash sales area, a credit sales area, a total sales area and an individual merchandise sales area.

5. A data input/output system as claimed in claim 4, wherein to the amount of cash in said existing amount of cash area there is added the amount of cash put in during operation of the setting-up pre-operation program and the amount of cash recorded in every cash sale during operation of the business programs, and there is reduced the amount of money withdrawn during operation of the cash take-off program, the responsible person shift program and the work closing program.

6. A data input/output system as claimed in claim 4, wherein said cash box is opened only through the programed initializing operation, the programed sale operation other than credit sale, the programed cash taking-off operation, the programed responsible person shift operation and the programed work closing operation.

7. A data input/output system as claimed in claim 4, wherein the fuel dispensation manner area in the RAM stores a pre-payment, post-payment and attendant modes, and means are provided for selecting one of said modes.

8. A data input/output system as claimed in claim 4, wherein the initializing program comprises a registration operation for a responsible person's code number and a setting operation for a cash transaction and is able to execute a sales transaction as part of said business programs.

* * * * *